(12) United States Patent
Poder et al.

(10) Patent No.: US 10,311,713 B2
(45) Date of Patent: *Jun. 4, 2019

(54) SECURING PROPERTY

(71) Applicant: Comcast Cable Communications, LLC, Philadelphia, PA (US)

(72) Inventors: Jim Poder, Cheltenham, PA (US); Mike Cook, Flemington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/478,358

(22) Filed: Apr. 4, 2017

(65) Prior Publication Data
US 2018/0025623 A1    Jan. 25, 2018

Related U.S. Application Data

(63) Continuation of application No. 14/584,535, filed on Dec. 29, 2014, now Pat. No. 9,646,488, which is a
(Continued)

(51) Int. Cl.
*G08B 29/20* (2006.01)
*H04N 21/41* (2011.01)
(Continued)

(52) U.S. Cl.
CPC ........... *G08B 29/20* (2013.01); *G08B 25/008* (2013.01); *G08B 25/14* (2013.01); *H04N 21/24* (2013.01);
(Continued)

(58) Field of Classification Search
None
See application file for complete search history.

(56) References Cited

U.S. PATENT DOCUMENTS

| 5,936,522 A | 8/1999 | Vogt |
| 6,502,669 B1 | 1/2003 | Harris |

(Continued)

FOREIGN PATENT DOCUMENTS

| FR | 2 792 751 A1 | 10/2000 |
| GB | 2 162 978 A | 2/1986 |

(Continued)

OTHER PUBLICATIONS

Partial European Search Report—EP 11181398.6—dated Apr. 15, 2013.

(Continued)

*Primary Examiner* — Justin E Shepard
(74) *Attorney, Agent, or Firm* — Banner & Witcoff, Ltd.

(57) ABSTRACT

Methods, systems, and apparatuses for securing property are presented. Video content viewed by a user may be detected, and the user may be automatically prompted to change settings on a security system based on the detecting. A comparison of the current time with the duration of the video content may serve as the basis for such prompting. Additionally, a premise security system may be placed in a learning mode. Changes in position of a security sensor may be detected and used to set a permitted range of motion for the sensor. Further, a plurality of security sensor profiles may be stored, and each profile may identify a different predefined permitted range of motion of a sensor. The addition of a new sensor to a premise may be detected, and a user may be prompted, on a display, to identify a profile to be used for the new sensor.

31 Claims, 9 Drawing Sheets

---

Security Notice

The current time is 9:02 p.m. You have just started playback of "Terminator 2: Judgment Day," which is 137 minutes long and will conclude at 11:19 p.m.

As 11:19 p.m. is later than the usual time when you arm your security system, would you like to arm your security system now?

Yes    No

Related U.S. Application Data continuation of application No. 12/882,547, filed on Sep. 15, 2010, now Pat. No. 8,955,022.

(51) Int. Cl.

| | |
|---|---|
| *H04N 21/24* | (2011.01) |
| *H04N 21/466* | (2011.01) |
| *H04N 21/40* | (2011.01) |
| *H04N 21/442* | (2011.01) |
| *H04N 21/45* | (2011.01) |
| *H04N 21/422* | (2011.01) |
| *H04N 21/25* | (2011.01) |
| *G08B 25/00* | (2006.01) |
| *G08B 25/14* | (2006.01) |
| *G08B 21/02* | (2006.01) |

(52) U.S. Cl.
CPC .......... *H04N 21/25* (2013.01); *H04N 21/251* (2013.01); *H04N 21/40* (2013.01); *H04N 21/41* (2013.01); *H04N 21/4131* (2013.01); *H04N 21/422* (2013.01); *H04N 21/42202* (2013.01); *H04N 21/42204* (2013.01); *H04N 21/442* (2013.01); *H04N 21/44204* (2013.01); *H04N 21/44213* (2013.01); *H04N 21/44218* (2013.01); *H04N 21/44222* (2013.01); *H04N 21/45* (2013.01); *H04N 21/4532* (2013.01); *H04N 21/466* (2013.01); *H04N 21/4661* (2013.01); *H04N 21/4662* (2013.01); *H04N 21/4667* (2013.01); *G08B 21/0236* (2013.01); *G08B 21/0238* (2013.01)

(56) References Cited

U.S. PATENT DOCUMENTS

| | | |
|---|---|---|
| 6,570,610 B1 | 5/2003 | Kipust |
| 6,912,429 B1 | 6/2005 | Bilger |
| 7,509,221 B2 | 3/2009 | Folken et al. |
| 8,193,935 B2 | 6/2012 | Gates |
| 2004/0012502 A1 | 1/2004 | Rasmussen |
| 2004/0030531 A1 | 2/2004 | Miller et al. |
| 2004/0201471 A1 | 10/2004 | Primm et al. |
| 2005/0067816 A1 | 3/2005 | Buckman |
| 2006/0023061 A1 | 2/2006 | Vaszary et al. |
| 2006/0074810 A1 | 4/2006 | Verberkt et al. |
| 2006/0176167 A1 | 8/2006 | Dohrmann |
| 2006/0294565 A1 | 12/2006 | Walter |
| 2007/0067810 A1 | 3/2007 | Durden et al. |
| 2007/0247302 A1 | 10/2007 | Martin |
| 2008/0022322 A1 | 1/2008 | Grannan et al. |
| 2008/0117072 A1 | 5/2008 | Hallbert et al. |
| 2008/0150717 A1 | 6/2008 | Guillemot et al. |
| 2008/0150743 A1 | 6/2008 | Grehant |
| 2008/0168523 A1 | 7/2008 | Ansari et al. |
| 2009/0025027 A1 | 1/2009 | Craner |
| 2009/0070436 A1 | 3/2009 | Dawes et al. |
| 2009/0249428 A1 | 10/2009 | White et al. |
| 2010/0141425 A1 | 6/2010 | Tracey et al. |
| 2010/0156667 A1 | 6/2010 | Bennie et al. |
| 2010/0312366 A1 | 12/2010 | Madonna et al. |
| 2011/0032423 A1 | 2/2011 | Jing et al. |
| 2012/0066707 A1 | 3/2012 | Poder et al. |
| 2012/0195449 A1 | 8/2012 | Thiede et al. |
| 2014/0373074 A1 | 12/2014 | Hwang et al. |

FOREIGN PATENT DOCUMENTS

| | | |
|---|---|---|
| WO | 2006/044443 A2 | 4/2006 |
| WO | 2007/147012 A2 | 12/2007 |

OTHER PUBLICATIONS

Chadwick et al: "Home Automation using HomeVision", Internet Citation, Nov. 1996 (Nov. 1996), XP002123844, Retrieved from the Internet: URL:http:jjwww.homeautomator.comjhomevision.htm [retrieved on Nov. 25, 1999].
Extended European Search Report—EP11181398.6—dated Jul. 17, 2013.
European Office Action—EP Appl. 11181398.6—dated Dec. 16, 2015.
Canadian Office Action—CA Appl. 2,751,731—dated Jun. 21, 2017.
Oct. 13, 2017—European Office Action—EP 11181398.6.
Sep. 8, 2017—European Communication Regarding Oral Proceedings—EP 11181398.6.
Jun. 21, 2018—Canadian Office Action—CA 2,751,731.
U.S. Appl. No. 14/084,228, Premises Automation Control, filed Nov. 19, 2013.

*Security Notice*

The current time is 9:02 p.m. You have just started playback of "Terminator 2: Judgment Day," which is 137 minutes long and will conclude at 11:19 p.m.

As 11:19 p.m. is later than the usual time when you arm your security system, would you like to arm your security system now?

Yes    No

*Security/Home Automation Notice*

The current time is 9:02 p.m. You have just started playback of "Terminator 2: Judgment Day," which is 137 minutes long and will conclude at 11:19 p.m.

Would you like to dim the lighting?

Yes    No

*Security Notice*

A new security sensor has been detected.

Would you like to associate the new security sensor with a sensor profile?

Yes                    No

*Tip*: By associating your new security sensor with a sensor profile, the system will provide default configuration parameters for the security sensor, thereby making it easier for you to configure your security system.

*Select A Sensor Profile...*

The sensor is attached to a:
- [X] Chair
- [ ] Table
- [ ] Wall-Mounted Television
- [ ] Floor-Mounted Safe
- [ ] Vertical-Opening Window
- [ ] Horizontal-Sliding Door
- [ ] Other (*enter learning mode*)

Continue                    Cancel

*Security Notice*

A new security sensor has been detected.

Would you like to place the security sensor in learning mode to configure its permitted range of motion or other settings?

Yes          No

*Security Notice*

Your new security sensor is now in learning mode.

Please move the security sensor or associated object through a permissible range of motion (e.g., through a range of motion for which you do NOT want an alarm to be triggered when the system is later armed).

Select "Continue" when you are done. Select "Cancel" to go back.

Continue          Cancel

SECURING PROPERTY

CROSS REFERENCE TO RELATED APPLICATIONS

This application is a continuation of U.S. patent application Ser. No. 14/584,535, filed Dec. 29, 2014, now U.S. Pat. No. 9,646,488, which is a continuation of U.S. patent application Ser. No. 12/882,547, filed Sep. 15, 2010, now U.S. Pat. No. 8,955,022, which are incorporated in their entirety herein by reference.

BACKGROUND

The present disclosure relates generally to securing property, such as real property and personal property.

Electronic security systems are a popular way of securing and monitoring property. Indeed, more and more homes, businesses, and other structures have security systems. Current security systems often include simple keypads and small displays, which some users may find inconvenient or difficult to use. In addition, such systems may include simple sensors that are susceptible to producing false alarms. As technology advances, however, users will come to expect more convenient, well-featured, and easy to use security systems like those described below.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to securing property. For example, by using one or more aspects of the disclosure, a security system user, such as a caretaker, business owner, or homeowner, may be able to use their television or another display to add, configure, arm, and monitor security sensors attached to their property. In one arrangement, the security system may automatically prompt the user, via their television, to arm or change other settings of their security sensors based on video content being viewed by the user. For instance, if the user starts watching a long movie at night, the security system may ask the user, via their television, whether they would like to arm their security sensors for the night. In another arrangement, the security system may allow the user to configure security sensors using their television, and the security system may be able to learn acceptable ranges of motion for the security sensors. For instance, the security system may learn to not trigger an alarm when a window rattles in its frame from the wind.

Thus, according to one or more aspects of the disclosure, video content viewed by a user may be detected, and the user may be automatically prompted to change settings of a security system in response to such detecting. In at least one arrangement, a current time may be compared with a duration of the video content prior to the prompting, and based on this comparison, it may be determined to display the prompt. Additionally or alternatively, a current volume level may be compared with a predetermined threshold volume level prior to the prompting, and based on this comparison, it may be determined to display the prompt. In at least one additional arrangement, a content rating level of the video content may be compared with a predetermined threshold rating level prior to the prompting, and based on this comparison, it may be determined to display the prompt. In one or more additional arrangements, the security system automatically may be armed in response to detecting the user's video content viewing. Additionally or alternatively, the user may be automatically prompted to adjust lighting conditions in response to detecting the video content.

According to one or more additional aspects of the disclosure, changes in position of a sensor may be detected during a learning mode. Then, the detected changes in position of the sensor may be set to be a permitted range of motion for the sensor. Subsequently, positional information associated with the sensor may be monitored to determine if the sensor has exceeded the permitted range of motion. In at least one arrangement, the security sensor may include one or more accelerometers and/or magnetometers. In at least one additional arrangement, an amount of vibration of the sensor may be detected during the learning mode, the detected amount of vibration may be set to be a permitted amount of vibration for the sensor, and, vibration information associated with the sensor may be monitored to determine if the sensor has exceeded the permitted amount of vibration. Additionally or alternatively, a remote monitoring entity may be alerted if it is determined that the sensor has exceeded the permitted range of motion and/or the permitted amount of vibration.

According to one or more additional aspects of the disclosure, a plurality of security sensor profiles may be stored, and each sensor profile may identify a predefined permitted range of motion of a sensor. Then, an addition of a new sensor may be detected, and a user may be prompted, on a display, to identify a sensor profile to be used for the new sensor. In at least one arrangement, positional information associated with the new sensor may be monitored to determine if the sensor has exceeded the predefined permitted range of motion associated with the identified sensor profile.

BRIEF DESCRIPTION OF THE DRAWINGS

The present disclosure is illustrated by way of example and not limited in the accompanying figures in which like reference numerals indicate similar elements and in which:

FIG. 5 illustrates a sample user interface according to one or more aspects described herein.

FIG. 6 illustrates another sample user interface according to one or more aspects described herein.

FIGS. 8-11 illustrate example user interface screens according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
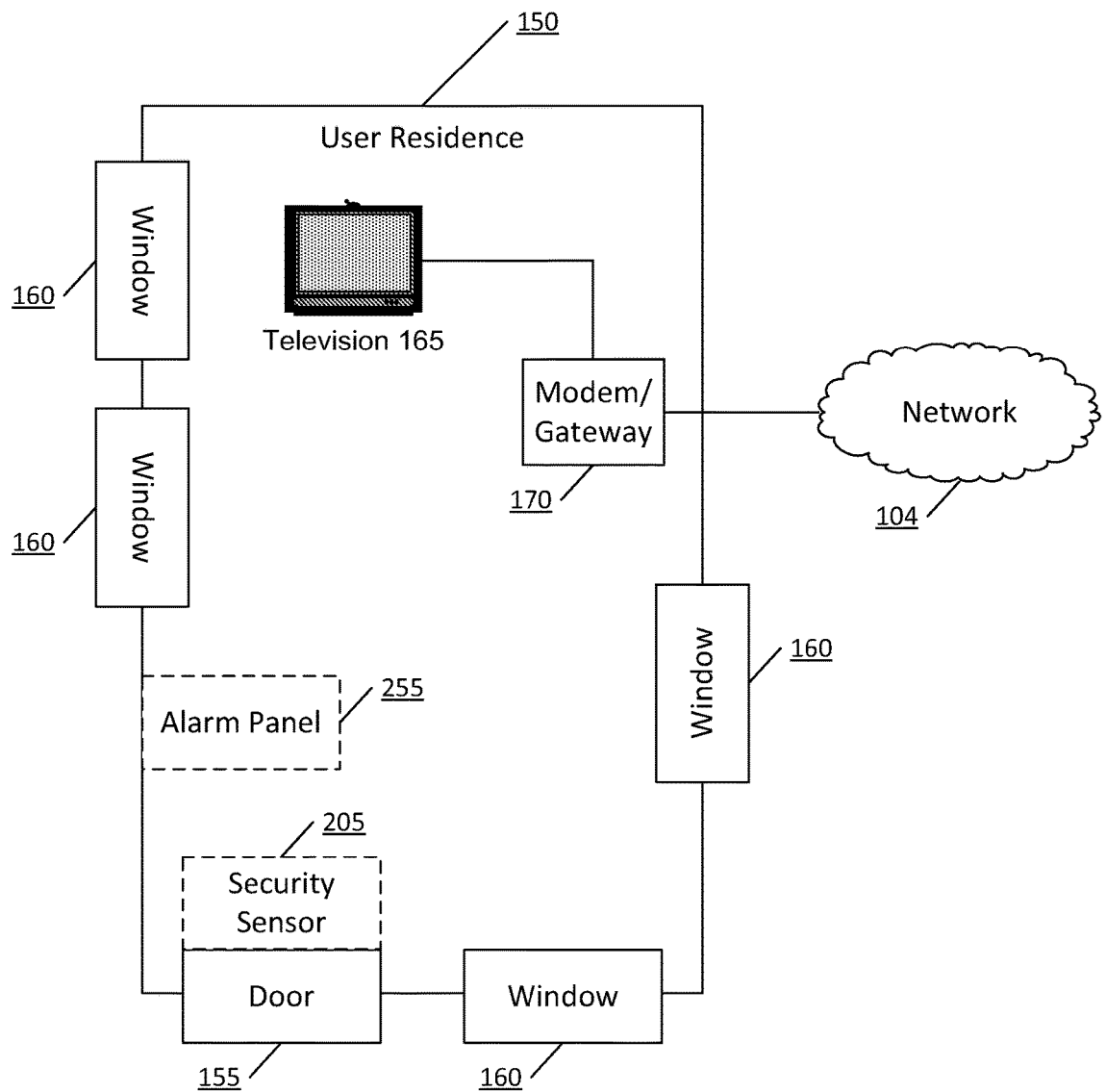
FIG. 1 illustrates an example operating environment in which a premise and/or one or more properties may be secured according to one or more aspects described herein.

FIG. 1 illustrates an example operating environment in which a premise 150, such as user residence, business, recreational facility, etc. (referred to herein as a user residence or premise in a non-limiting manner), and/or one or more properties, such as television 165, may be secured according to one or more aspects described herein. For example, user residence 150 may include a door 155 and a plurality of windows 160. The door 155 may be secured by an associated security sensor 205. In addition, the plurality of windows 160 each also may be secured by associated security sensors. The security sensor 205 may be communicatively coupled to an alarm panel 255, which may allow the security sensor 205 to be armed, disarmed, and monitored. For instance, a user may operate alarm panel 255 to arm security sensor 205, such that if door 155 is opened while the security sensor 205 is aimed, an alarm will be triggered. In at least one arrangement, the alarm panel 255 may be implemented in and/or as part of gateway 170. Thus, in one example, gateway 170 may be communicatively coupled to security sensor 205, which may allow gateway 170 to arm, disarm, and/or monitor security sensor 205.

In one or more arrangements, the security sensor 205 and the alarm panel 255 also may be communicatively coupled to an external network interface, such as a modem and/or gateway 170 and/or to a user interface device, such as television 165. The modem/gateway 170 may include circuitry/software for communicating on an external network 104. For example, network 104 may include a fiber, coaxial cable, hybrid fiber/coaxial, cellular, satellite, or any other desired communication medium, and the modem/gateway 170 may include any necessary device for communication on the medium, such as a modem, coaxial cable modem, optical termination interface, satellite receiver, etc. for communicating on that medium.

The security sensor 205 and the alarm panel 255 may communicate with the modem/gateway 170 and the television 165, and a service provider may be able to provide advanced security system configuration and monitoring services to the user residing in or otherwise desiring to protect user residence 150. For example, the user may be able to arm the security sensor 205 using the television 165 (e.g., via one or more user interfaces displayed on the television 165 and/or the modem/gateway 170). In another example, a service provider may be able to monitor the security sensor 205 via the network 104, which is further described below with respect to FIG. 3.

Figure 2:
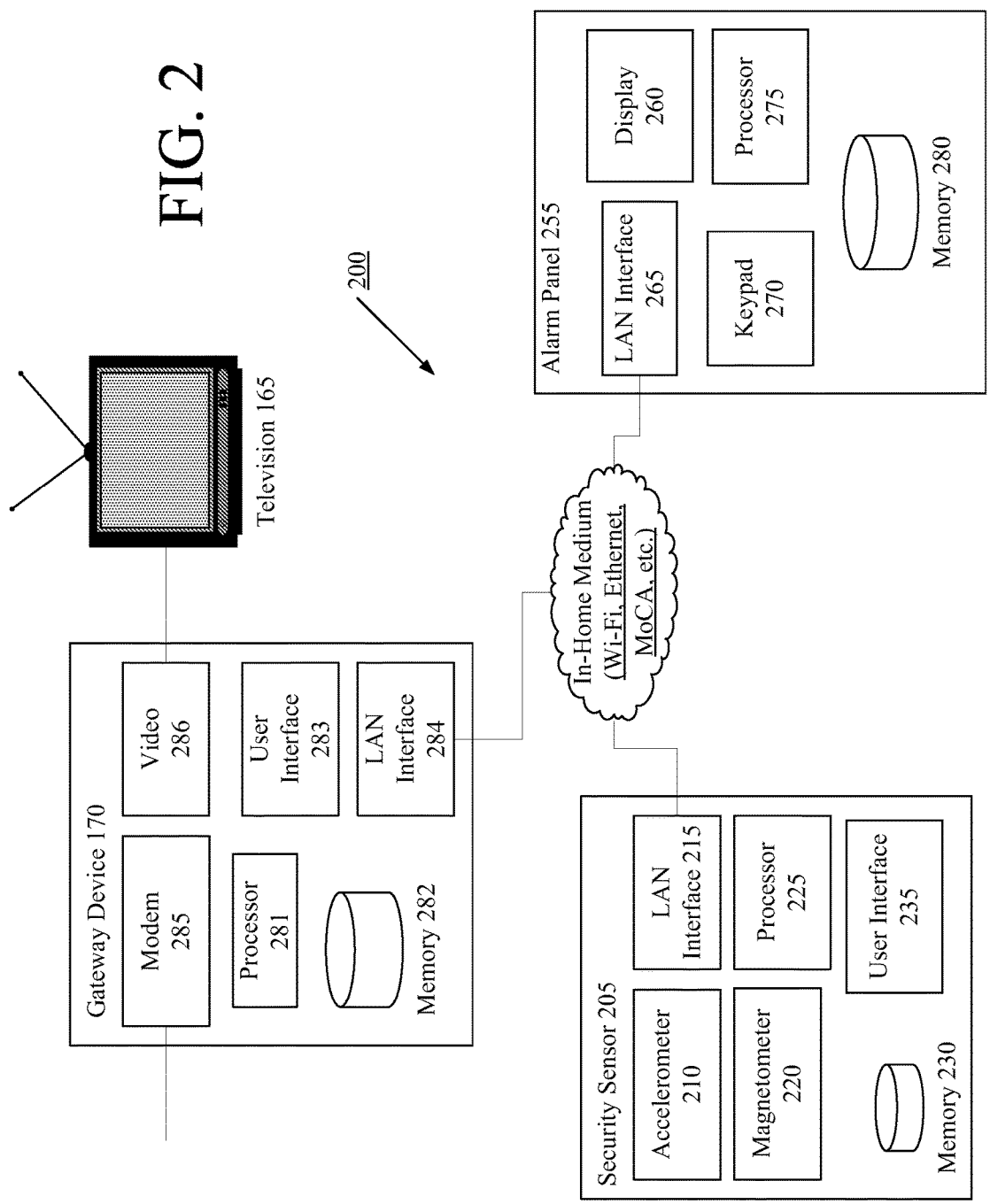
FIG. 2 illustrates an example security system that may be used in securing a premise and/or one or more properties according to one or more aspects described herein.

FIG. 2 illustrates an example security system 200 that may be used in securing a premise and/or one or more properties according to one or more aspects described herein. Security system 200 may include an alarm panel 255, a gateway device 170, and one or more security sensors 205 placed around the house and on various objects to be secured. These example components are described in greater detail below.

According to one or more aspects, one or more security sensors 205 may be attached to various objects that are to be secured, such as windows, doors, furniture (e.g., a chair, a table, an armoire), electronic equipment (e.g., a television, a stereo, a video game console, a computer, a telephone), a fixture (e.g., a safe, a chandelier, a painting, a grill, etc.), an automobile, automobile accessories (e.g., a car stereo, a GPS navigation device, a portable telephone), etc.

The security sensor 205 may be simple or complex. For example, a complex security sensor 205 may include one or more processors 225 configured to execute software instructions stored on a memory 230 (e.g., any computer-readable medium, such as flash memory or a hard drive) to perform various functions described herein. The sensor 205 may also include one or more accelerometers 210, which may be configured to detect acceleration and/or movement along one or more axes.

The sensor 205 may also include one or more magnetometers 220, which may be configured to detect magnetic fields for directional orientation (e.g., north, south) and/or proximity between two items (e.g., an induction coil on a window frame whose magnetic field is disturbed by the proximity of a second component on the window itself). Of course, some of the detection described herein may be performed by the processor 225, based on readings taken from the accelerometer and/or magnetometer. Other types of sensing devices may be included as well, such as contact switches, infrared motion detectors, microphone sound detectors, cameras, thermal sensors, etc.

The sensor 205 may include one or more user interfaces 235. The user interfaces 235 may be, for example, any desired type of device to allow interaction with a user, such as buttons, lights, LED displays, audio speakers, etc.

The sensor 205 may also include a local area network interface 215. The local area network interface 215 may implement any desired type of communication medium for communicating signals between all components in the premise. For example, the interface 215 may be a wireless IEEE 802.11 interface, allowing the sensor 205 to wirelessly communicate with the alarm panel 255, gateway device 170, and/or other devices. Other wireless interfaces could be used as well, such as 802.15.4, ZigBee, Z-Wave, Bluetooth, etc. The interface 215 can also use a wired medium, such as a MoCA (Multimedia Over Coax Alliance) interface connected to the in-home coaxial cable network, or to an Ethernet network.

Security sensor 205 also may include other components, such as a battery or other power supply, an indicator light, and an antenna, as well as additional accelerometers, magnetometers, transceivers, processors, memory, and input/output interfaces.

Accelerometer 210 and magnetometer 220 may allow security sensor 205 to measure movement and determine changes in the position, location and/or orientation of security sensor 205, which may enable the security sensor 205 to be used as a motion sensor and as a trigger of alerts and/or security events, as further described below. For instance, accelerometer 210 may provide acceleration data to processor 225, and processor 225 may use such acceleration data in combination with time data provided by an internal clock (not illustrated) to compute the distance traveled by the security sensor 205. While distance traveled may be calculated, for example, by computing the double integral of an acceleration function over a relevant time domain (and accounting for initial velocity and distance), this distance calculation may be simplified by approximating the distance traveled as the sum of distance values computed for small time intervals where, during the relevant time interval, acceleration is assumed to be constant (e.g., during a time interval, acceleration may be assumed to be the initial acceleration of the time interval or the average acceleration over the time interval). Furthermore, if accelerometer 210 measures acceleration in two axes, or if security sensor 205 is equipped with multiple one-axis accelerometers, processor 225 may be able to calculate position vectors (e.g., distances in multiple axes, with distance in each axis being expressed as a vector component) and may be able to calculate the direction of motion based on such vectors (e.g., by using trigonometric functions to compute angles between the vector components included in a vector).

Additionally or alternatively, magnetometer 220 may provide orientation data to processor 225, and processor 225 may use such orientation data to determine changes in the direction of the security sensor 205. Orientation data may represent the direction in which the security sensor 205 is pointed or moving, which may be expressed as an angle relative to the Earth's North magnetic pole. Like acceleration data, orientation data may enable the security sensor 205 to be used as a motion sensor and as a trigger of alerts and/or security events, as further described below. Alternatively, accelerometer 210 and magnetometer 220 may transmit data to processor 275, or any other external processing device, for processing.

The various motion, position, location, movement, etc. detected by the sensor 205 may be reported via the LAN interface 215 to the alarm panel 255. The alarm panel 255 may operate within security system 200 to monitor one or more security sensors 205 included in security system 200, such as security sensor 205, and may provide additional functionalities, such as allowing a user to arm security system 200 and/or security sensor 205. For instance, alarm panel 255 may be attached to a wall near an entrance to a secured area, and a user may interact with alarm panel 255 to arm security system 200 and/or security sensor 205. In addition, alarm panel 255 may include a plurality of components, as further described below, that may enable alarm panel 255 to communicate with other devices included in security system 200 and thereby provide arming, monitoring, and other functionalities.

To provide this functionality, the alarm panel 255 may also include a processor 275, operating to execute software instructions stored in a computer-readable memory 280 (e.g., flash, hard drive, etc.). The alarm panel may include various user interface elements, such as a display 260 and a keypad 270 for input.

In one or more arrangements, alarm panel 255 may be implemented as hardware and/or software components in another device, such as modem/gateway 170 of FIG. 1 or gateway 106a of FIG. 3, which is further described below. Or, some or all of the alarm panel functionality can be duplicated in the gateway device 170, and the gateway may include similar components as those found in the alarm panel. For example, gateway 170 may include a processor 281, configured to execute instructions stored on a computer-readable memory 282. It may also include one or more user interfaces 283 (e.g., buttons, keypads, infrared remote control, etc.), and a local area network interface 284 to allow communications with the sensors 205 and/or alarm panel 255 (and with other devices in the home).

The gateway 170 may also include other communication devices as well. For example, it may include a device for communicating with an external network, such as a modem 285, which may be connected to, and communicate with, an external network 104. It may also include video processing circuitry 286, which can decode and/or decrypt incoming video signals, and generate an output signal that can be supplied to a display device, such as television 165. In some embodiments, the gateways described herein (e.g., gateway 170, 106a, etc.) may include functionality of traditional television set-top boxes (STBs) and/or digital video recorders (DVRs).

The gateway 170 may generate one or more user interface screens, for display on the television 165, that allow a user to arm and disarm security system 200, configure attributes of a security sensor 205, manage sensor profiles, transmit test alerts, and monitor one or more security sensors 205 included in security system 200, as further described below.

Figure 3:
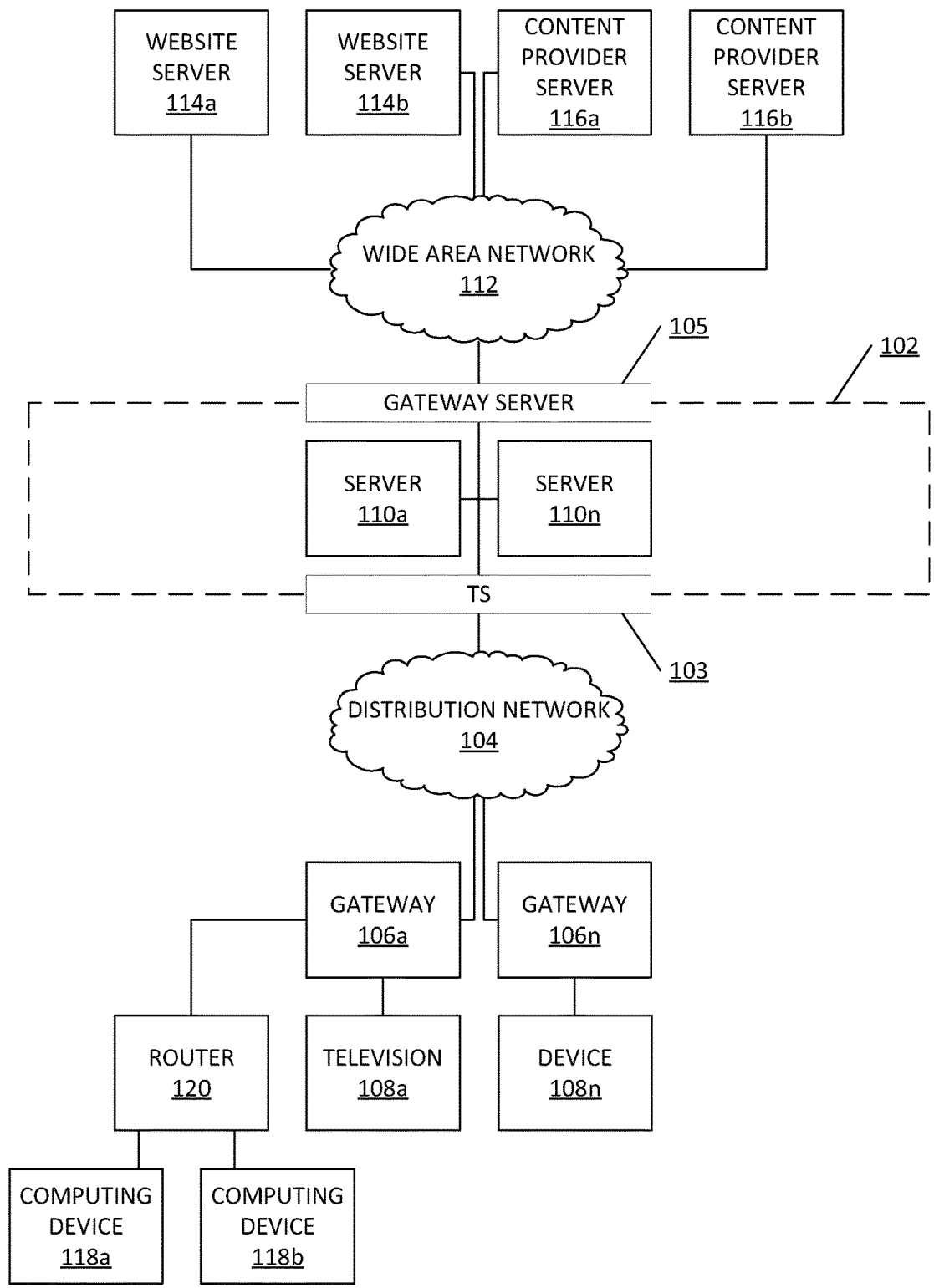
FIG. 3 illustrates an example network environment to which a security system may be communicatively coupled according to one or more aspects described herein.

FIG. 3 illustrates an example network environment to which a security system, such as security system 200 of FIG. 2, may be communicatively connected according to one or more aspects described herein. For example, the network environment may include a server or processing facility 102. The server or processing facility 102 may include a plurality of devices, such as servers 110a-110n, as well as other devices, including other data servers, computers, processors, security encryption and decryption apparatuses or systems, and the like. In one or more configurations, one or more devices in the server or processing facility 102 may comprise a termination system 103, such as a Modem Termination System (MTS) and/or a Cable Modem Termination Server (CMTS) if the network is an HFC-type network. The termination system 103 may facilitate communication between the server or processing facility 102 and one or more gateways 106a-106n, which also may be included in the network environment, and which are further described below.

According to one or more aspects, the server or processing facility 102 may be connected to one or more wide area networks 112, such as the Internet, via a network gateway server 105. Via wide area network 112, the server or processing facility 102 may be able to access other devices connected to the network 112, such as website server 114a and website server 114b, or one or more content provider servers, such as content provider server 116a and content provider server 116b.

According to one or more additional aspects, the network environment further may include a distribution network, such as the distribution network 104 of FIG. 1. Distribution network 104 may include communication links such as one or more coaxial cable, optical fiber, hybrid fiber/coaxial cable, cellular, satellite, WiMax, and/or other wired or wireless connections, which may facilitate communication between the server or processing facility 102 and the one or more gateways 106a-106n. For example, the network 104 may include a series of coaxial cables, fiber optic cables, and splitters leading from a processing facility or headend to various homes in a neighborhood, resulting in a hybrid fiber/coaxial (HFC) distribution network.

The network environment further may include one or more gateways 106a-106n and one or more corresponding consumption devices 108a-108n. Gateways 106a-106n each may include an interface device that is configured to receive and transmit content from/to the server or processing facility 102, and processing circuitry to convert the content into a format for consumption by a user of the consumption devices. The content may include any desired data, such as video content, Internet data, and/or television programming. In one or more configurations, gateways 106a-106n may include one or more modems (e.g., cable modems), optical interface devices, set-top boxes (STBs), and/or digital video recorders (DVRs). Thus, the network environment may be used as a media service provider/subscriber system in which a provider and/or vendor generally operates the server or processing facility 102 and/or the distribution network 104, and which the provider and/or vendor generally also provides a user (e.g., a subscriber, client, customer, service purchaser, etc.) with one or more gateways 106a-106n.

One or more gateways 106a-106n may be placed at a user location such as a user's home, a tavern, a hotel room, a business, etc., and one or more consumption devices 108a-108n may be provided by the user. The consumption device 108a may include a television, high definition television (HDTV), monitor, host viewing device, MP3 player, audio receiver, radio, communication device, personal computer, media player, digital video recorder, game playing device, smart phone, or the like. Additionally or alternatively, the consumption device 108a may be implemented as a transceiver having interactive capability in connection with gateway 106a and/or the server or processing facility 102.

According to one or more aspects, the gateway 106 may provide a user with access to a wide area network 112, and the various other devices on the network 112, such as website server 114a, website server 114b, content provider server 116a, and/or content provider server 116b. The gateways may also support on-premises communication among devices at the user's location, such as a home's routers 120, televisions 108, computers 118, etc. Additionally or alternatively, content received at gateway 106a may be supplemented and/or customized by data obtained via wide area network 112. In one or more configurations, a router 120 may be configured to route data from a gateway, such as gateway 106a, to a computing device, such as computing device 118a. In one or more additional configurations, gateway 106a may perform such routing, and computing device 118a and/or computing device 118b may be connected directly to gateway 106a.

Figure 4:
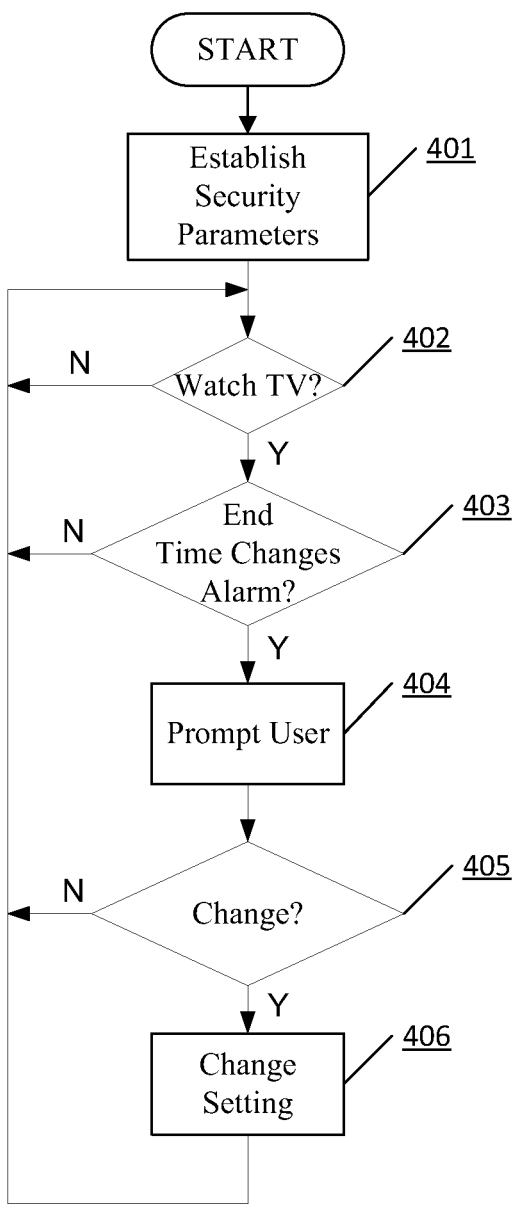
FIG. 4 illustrates a method according to one or more aspects described herein.

Having a gateway, such as gateway 106a or gateway 170, provide home security features offers several benefits and possibilities. For example, if the gateway 170 is aware of the user's television viewing habits, the gateway 170 can intelligently use that information to control the operation of the home security system. For example, FIG. 4 illustrates an example method in which a gateway 170 can sense that a user is settling in for the night, and can automatically prompt the viewer to determine whether the alarm system should be activated for the night.

In step 401, the system may first establish security parameters. This may involve, for example, determining the times of day (or night) that the home security system is to be activated, and determining security levels for those time periods. For example, overnight hours may involve setting the security system at its highest alert level, in which case sensors may be less tolerant of movement, more sensors may be active, and/or alert actions may be more dramatic (e.g., alerting police more rapidly, or sounding an audible alarm more quickly), while early evening hours may be more tolerant of movement, and some sensors may be deactivated, because people are more apt to be moving about the house during those hours. The following table may be an example of such parameters:

| Time Period | Front Door | Bedroom Window | Alert Level |
|---|---|---|---|
| 11 pm-6 am | On | On | High |
| 6 am-9 am | Off | On | Med |

| Time Period | Front Door | Bedroom Window | Alert Level |
|---|---|---|---|
| 9 am-6 pm | On | On | High |
| 6 pm-11 pm | Off | On | Med |

With the parameters in place, the process may proceed to step 402, and the gateway may detect, e.g., by continuously monitoring, a user choosing to watch a television program, movie, or other content on any display device. If the user has not begun to watch content, the process may remain at step 402 by continuously or intermittently monitoring. If the user has begun, the process may proceed to step 403, and determine if the chosen program is scheduled to end in a time period having different security parameters, e.g., a different alarm state. For example, with reference to the example table above, if the user sits down at 9 pm to watch a 3-hour movie, the gateway can determine that the security system will need to be in a "High" state of alert (at midnight), which is different from the current state of alert (9 pm would be "Medium"). The gateway can make this determination, for example, by consulting an internal clock, and an electronic program guide (EPG) database of video programs.

If such an alert state change (or change to another security parameter) would be needed or would be scheduled, then the gateway may proceed to step 404, and prompt the user to determine if the security system should proceed to the higher alert state at the current time. The prompt may be displayed, for example, as a pop-up message on the display screen after the program is selected. FIG. 5 illustrates an example pop-up that can appear here.

If the user wishes to change the security parameter (e.g., if the user knows that he/she intends to settle in for the night to watch the movie), then the user can respond to the prompt (e.g., by pressing an "ok" key on a handheld remote) in step 405, and the gateway can change the security setting in step 406. The process then returns to step 402 and continues to monitor for changes in what the user is viewing. A delay may be built into the process at steps 402, 403, and/or 404 to account for the user simply flipping through channels.

Of course, if the program's end time does not require a different alert state, or if the user responds negatively in step 405, the gateway can return to step 402, and resume monitoring for the selection of a different program by the user.

The above example addresses changes in security settings, but other time-related settings can be changed as well. FIG. 6 illustrates an example prompt that can appear if, for example, the user normally turns off or dims certain household lights when he/she turns in for the evening.

While the above examples describe prompting a user based on time-related parameters, such as the current time, the length and/or start and stop times of a particular program, and/or other security parameters, the security system described herein also may prompt the user based on other factors. For instance, the security system may prompt the user based on the current volume level (e.g., if the current volume level is too loud to hear an intruder breaking into the house, the security system may prompt the user to lower the volume) and/or the content rating associated with a program being watched (e.g., if the content rating suggests that the program is scary and that the user might feel better watching the program after securing their house, the security system may prompt the user to arm the system). Thus, in one example, the security system may decide to prompt the user based on a comparison of the current volume level and a predetermined threshold volume level (e.g., a volume level predetermined by the user or the service provider to be an optimal balance between listening to the program and listening to the user's surroundings). In another example, the security system may decide to prompt the user based on a comparison of the content rating level and a predetermined threshold rating level (e.g., a content rating predetermined by the user or the service provider to be associated with fear-invoking content).

In one or more additional arrangements, the security system may arm itself automatically based on the user's video content viewing habits. For instance, with reference to the example table above, if the user sits down at 9 pm to watch a three-hour movie, the gateway may again determine that the security system will be in a higher state of alert when the movie ends than when it begins. Thus, in this alternative instance, the gateway may automatically arm the security system based on this determination. When the gateway arms the security system automatically in this example, the gateway also might display a notification message on the user's display device to inform the user that the security system has been automatically armed. Additionally or alternatively, the security system may arm itself automatically in any and/or all of the example situations described elsewhere herein in which the security system may prompt the user (e.g., based on time-related parameters, based on the current volume level, based on content rating level, etc.).

The discussion above gives one example of what can be accomplished with the system described herein. As another example, the system herein may allow for easy expansion by the user, and may give the user greater flexibility in the types of alarms that he/she wishes to have active. For example, a user may have an existing security system 200 at home, and may decide to purchase an additional sensor 205. The sensor 205 can be mountable by the user on anything—a car, a garage door, a new barbecue grill, a screen door, etc., and the user can configure the system to customize the alert response for the new sensor.

Figure 7:
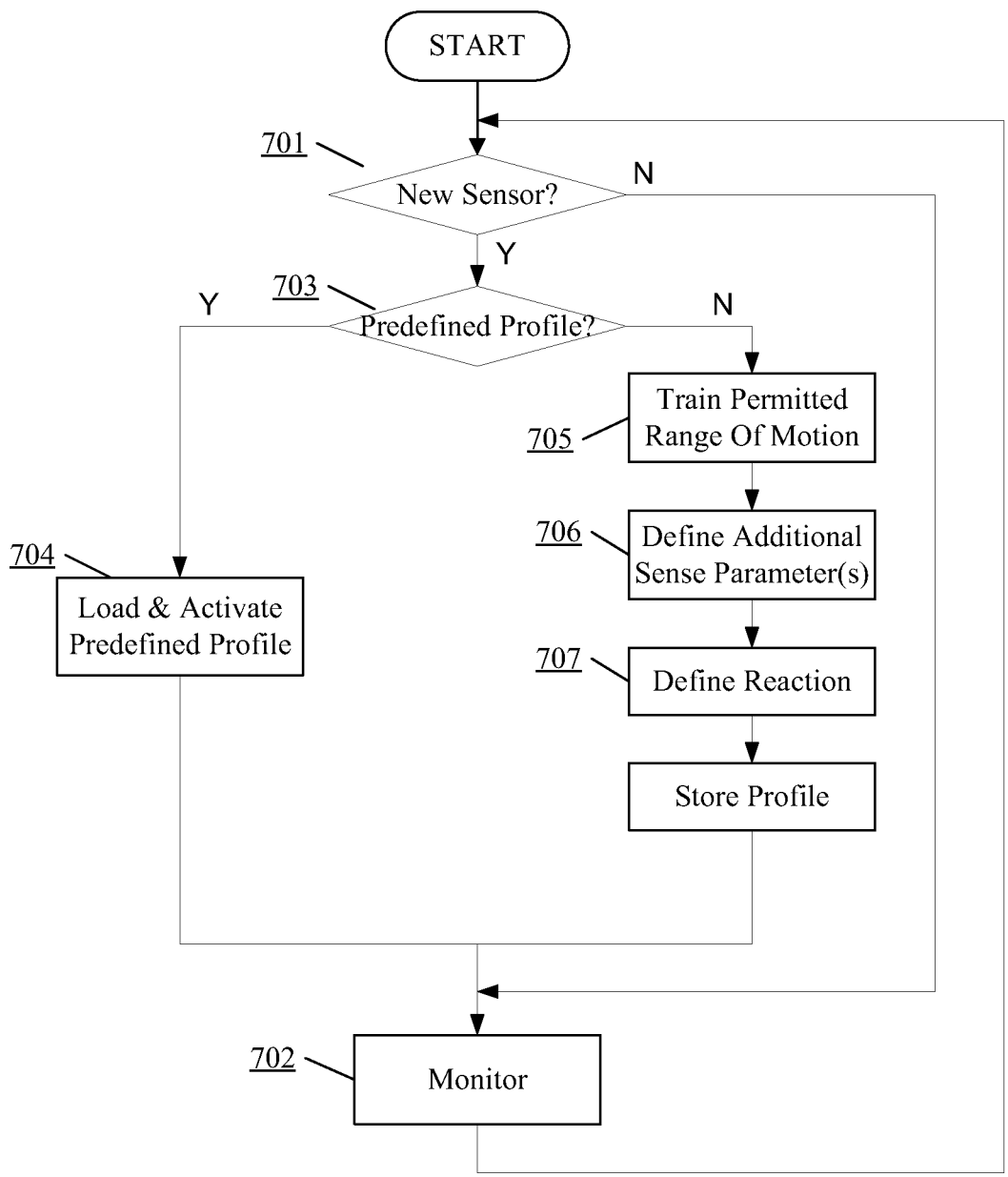
FIG. 7 illustrates a method for configuring and monitoring a security sensor according to one or more aspects described herein.

FIG. 7 illustrates an example process that the system may undertake when a new sensor is added to the home. Once the new security sensor is introduced into the home and powered on, the security system may detect the presence of the security sensor in step 701, thus enabling configuration and monitoring of the security sensor, as well as other functionalities, as further described herein. Such detection of the presence of the security sensor may occur automatically. For instance, the alarm panel 255 and/or gateway 170 may use a wireless local area network for communicating with its sensors, and the newly-introduced security sensor may enter or may be placed in a "pairing" mode when it is installed. While it is in pairing mode, the security sensor may transmit a distributed signal (e.g., a broadcast radio signal) indicating that the security sensor is new and/or online. The gateway and/or alarm panel may detect this broadcast signal, thereby learning of the new sensor. Alternatively, the gateway and/or alarm panel may simply be told by the user that a new sensor has been installed (e.g., by a menu option, or pressing a predefined "add sensor" button).

If no new sensor is detected, the gateway and/or alarm panel may proceed to step 702, to monitor its existing sensors, and periodically it may return to step 701 to check again for a new sensor. The monitoring in step 702 may include monitoring existing sensors and searching for new sensors. However, if a new sensor is detected, the process may proceed to step 703, and begin to configure the new sensor with a security profile, for example, defining what this sensor will sense and what the system should do with what is sensed.

The gateway and/or alarm panel may first determine whether a pre-existing profile already exists for the new sensor. For example, new sensors may be packaged and marketed to users for specific purposes. One sensor may specifically be a sensor for barbecue grills, and the manufacturer of the sensor may offer a data file (stored in the sensor or available for downloading) containing a table of parameters for using the sensor to secure a barbecue grill. The parameters may indicate, for example, that horizontal motion is acceptable but vertical motion is not (e.g., pushing the grill around a deck is normal grill behavior, but picking it up may be more indicative of someone trying to steal it), and further that the default alert response for someone stealing the grill is to turn on the household's external lights and to send an email to the user (but perhaps not bother with calling the police). The predetermined profiles may be a software download made available to purchasers of the sensor, or the software could be distributed on computer-readable media (e.g., a CD, built-in or external flash drive, etc.) with the sensor. Alternatively, the gateway and/or alarm panel may automatically store a database containing many different predefined security profiles (e.g., the gateway's security system software may include default profiles for common items, like doors, windows, cars, motion devices, etc.). As part of this, the gateway can display to the user a list of available profiles, and ask the user to choose one that fits the device being secured by the new sensor. FIGS. 8 and 9 illustrate example screens that can be displayed on the user's display screen (e.g., television) when a new sensor is detected.

The determination of whether a predefined profile exists may be made in a variety of ways. For example, if the new sensor automatically broadcasts its presence, it can also indicate in the broadcast that it has a predefined profile in its own memory, or that one is available for download. Alternatively, it could simply identify itself with an identifier (e.g., identifying a class of device, manufacturer, model number, serial number, etc.), and the gateway could search its own memory to determine if it already has a predefined profile for the new sensor. The gateway could also transmit a request out onto the Internet or another network (or a server associated with the maker of the sensor or the item being secured) asking if a predefined profile exists and, if it does, requesting a download of it.

If a predefined profile exists, then the process may proceed to step 704, and the predefined profile may be loaded for use by the gateway/alarm panel. This loading may be done in any desired manner (e.g., copying from a memory of the sensor, copying from a memory included with the sensor, copying from a pre-existing database in the gateway, downloading from an external server to the gateway, etc.). Once the profile is loaded, the process may proceed to step 702, and the system may begin security monitoring with the new sensor and parameters active.

If, in step 703, no predefined profile exists, then the process may proceed to step 705, and the user can begin a training process to train the security system in using the new sensor. This can be initiated, for example, by the gateway or alarm panel displaying (e.g., on alarm panel display 260, or on television 165) a message requesting that the user start the training for the new sensor. FIG. 10 illustrates an example screen that can be displayed on the television and/or alarm panel for this purpose.

In step 705, the user may train the system in the permitted range of motion for the new sensor. Using the barbecue grill example, once the user has installed the sensor to the grill, the sensor can begin reporting what it senses (e.g., acceleration, position, motion, etc.) via the local area network. The gateway and/or alarm panel may receive this information, and during the training, the user may inform the gateway/alarm panel of the acceptable range of motion. For the barbecue grill, the user may first instruct the gateway that the acceptable range of motion is beginning or is at a starting point (e.g., by pressing a key on the alarm panel or television remote control), and then the user can move the grill through the acceptable range. The acceptable range may be, for example, an area of the user's back patio or deck where the user expects to be using and storing the grill. While the user moves the grill around this acceptable area, the sensor can detect its position/motion/acceleration, and report this to the gateway/alarm panel, and the gateway/alarm panel may store information in memory identifying the area of the patio as being acceptable.

Other ranges of motion can be entered as well. For example, some windows include stoppers that allow them to be opened slightly to let fresh air in, but prevent them from opening more than a few inches. If the user wants to allow the window to open a certain amount, the user can define that as an acceptable range of motion (e.g., in the training mode, the user can open the window slightly). Similarly, if a door includes a bolt and chain allowing the door to be slightly opened, the user can define that slight opening as an acceptable range of motion. As another example, slight motion in irrelevant axes can be ignored. For example, a window normally moves vertically, but can slightly move horizontally in response to wind. The acceptable range of motion for the window can allow slight horizontal movement, and the system can be configured to only react to vertical movement. Another type of motion may be vibration. For example, many automobile theft alarms detect vibration of the car. In the learning state, the user could inform the gateway/alarm panel that a predefined amount of vibration is acceptable (e.g., vibration generated by a person bumping the car while walking past it to take out the trash). FIG. 11 illustrates an example screen that can be displayed on the user's television or alarm panel display during this process.

When the user has finished defining the acceptable range(s) of motion, the process may proceed to step 706, and the user can define any additional desired sensing parameters. For example, if the user wants different behavior for different times of day, then the user can define time ranges as additional sense parameters. Any other desired parameter can be combined as well (e.g., state of television viewing, number of cars in the garage, season of the year, outside temperature, etc.).

When the sense parameters have been set, the process may move to step 707, and the user can define the system's alarm reactions for the various parameters. In one or more arrangements, the security system may alert a remote monitoring entity in response to determining that a sensor has exceeded a permitted range of motion. For example, some combinations of sensed events (e.g., opening of a bedroom window at 2 am on a Winter's night) might immediately result in an alert signal being sent from the gateway to a remote monitoring entity, such as an external monitoring server and/or the local authorities, while slightly opening a window on a hot Summer afternoon might result in a less drastic response, such as an initial warning sound, before any authorities or external monitoring service are informed. Such "High" and "Low" alert reaction levels may be customized by the user in any desired combination, and can be done so from the user's own couch in front of the television.

When the alarm reactions have been defined, the process may then store the parameters (sense parameters, permitted range of motion, alert reactions, etc.) in a profile on a memory 282, 230, or 280. The profile can become a predetermined profile for future new sensors, and can be labeled by device type for convenience (e.g., a barbecue grill sensor for the patio might result in a profile that can equally be used for other patio items, such as furniture, tables, umbrellas, etc.). The gateway may then proceed to step 702, and resume monitoring the sensors (before periodically returning to step 701 to determine if a new sensor has been detected.

Figure 12:
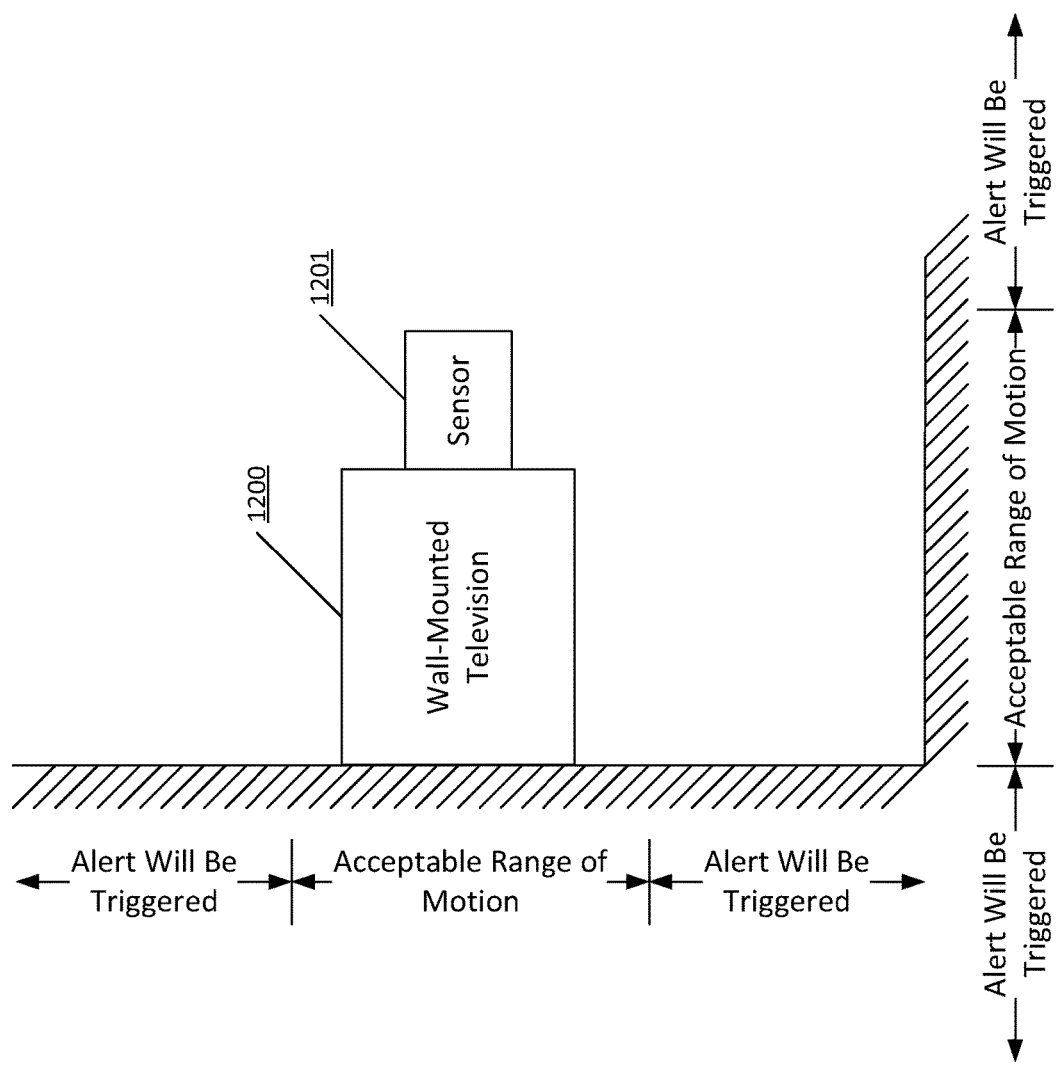
FIG. 12 illustrates an example illustration of a range of motion according to one or more aspects described herein.

The example above describes allowing a user to define acceptable ranges of motion for new security sensors, and there are many advantageous implementations of this concept. For instance, with reference to FIG. 12, wall-mounted television 1200 may be mounted to a wall via a mounting bracket that allows the television to be moved in and out from the wall, moved laterally along the wall, and tilted through a range of viewing angles. This motion may result in a slight horizontal motion and a slight vertical motion, and the user may wish to allow this slight range of motion, while larger motions may be more indicative of theft. The user may configure security sensor 1201 by placing security sensor 1201 in learning mode and moving the television through a series of acceptable movements (e.g., by moving the television in and out from the wall, by moving the television laterally along the wall, and by tilting the television through a range of viewing angles). Once security sensor 1201 is switched out of learning mode and into a default monitoring state, the gateway might not trigger a security event if security sensor 1201 detects only acceptable movements. On the other hand, if security sensor 1201 detects motion not included in the acceptable movements, gateway may trigger a security event.

Thus, in another example, a security sensor may be placed in an automobile, and a second security sensor may be attached to a portable GPS navigation device that the user keeps in the automobile. Using the security system described herein, the user may be able to define an acceptable range of motion for the automobile (e.g., after 9 p.m., the automobile should not travel beyond the driveway and the garage without triggering an alert) and the portable GPS navigation device (e.g., after 9 p.m., the portable GPS navigation device also should not travel beyond the driveway and the garage without triggering an alert).

In at least one arrangement, an acceptable range of motion for a first security sensor may be defined in relation to a second security sensor. Thus, in the example above, the user may be able to define an acceptable range of motion for the portable GPS navigation device both independently of the automobile's security sensor (e.g., after 9 p.m., the portable GPS navigation device should not travel beyond the driveway and the garage without triggering an alert), as well as in relation to the automobile's security sensor (e.g., while the car is parked in the driveway, the portable GPS navigation device should not travel more than 10 feet away from the car). This arrangement may prevent a would-be thief from breaking into the car and running off with the portable GPS navigation device.

The features described above are examples of various concepts, and they may be modified in any desired manner. For example, various elements and steps may be divided, combined, rearranged, omitted, and augmented as desired. The various elements may be implemented using computer components, such as processors and computer-readable memories, and any of the elements described herein may be implemented using software, hardware (e.g., similar to that shown in FIG. 2), or any combination of the two. The scope of this patent should only be limited by the claims that follow.

What is claimed is:

1. A method comprising:
causing, by a computing device, display of video content;
determining, by the computing device and based on viewing information, that the video content is expected to be viewed at a future time associated with a future security level, of a security system, different from a current security level of the security system; and
based on the determining, causing display of a notification indicating that the security system is scheduled to change from the current security level to the future security level after a start time of the video content.

2. The method of claim 1,
wherein the video content is a video program, and
wherein the future time is an end time of the video program.

3. The method of claim 1, wherein the current security level and the future security level are associated with different permitted ranges of motion for a security sensor of the security system.

4. The method of claim 3, wherein the security system is configured to trigger a first alarm based on the security sensor sensing that an object has moved beyond a first permitted range of motion, and wherein the security system is configured to trigger a second alarm based on the security sensor sensing that the object has moved beyond a second permitted range of motion greater than the first permitted range of motion.

5. The method of claim 1, further comprising:
determining that the video content has been displayed for a particular time period,
wherein the determining that the video content is expected to be viewed at a future time associated with the future security level is performed after determining that the video content has been displayed for the particular time period.

6. The method of claim 1, further comprising:
after determining that the video content has been displayed for a particular time period, causing display of a prompt to adjust lighting conditions.

7. The method of claim 1, further comprising:
comparing a current volume level of the video content with a predetermined threshold volume level; and
after determining that the current volume level of the video content is greater than the predetermined threshold volume level, causing display of a prompt to lower the current volume level.

8. The method of claim 1, wherein the causing display of the notification is further based on determining that the video content is associated with fear-invoking content.

9. A method comprising:
causing, by a computing device, display of a video program;
determining, by the computing device, a current security level of a security system;
determining, by the computing device, that the security system is scheduled to change from the current security level to a future security level after a start time of the video program; and
based on the determining that the security system is scheduled to change from the current security level to the future security level before the start time of the video program, causing display of a notification indicating that the security system is scheduled to change from the current security level to the future security level after the start time of the video program.

10. The method of claim 9, wherein the causing display of the notification is further based on determining, based on viewing habits of a user, that the user will continue to view the video program.

11. The method of claim 9, wherein the causing display of the notification is further based on determining that the video program has been displayed for at least a particular time period.

12. The method of claim 9, wherein the current security level and the future security level are associated with different permitted ranges of motion for a security sensor of the security system.

13. An apparatus comprising:
one or more processors; and
memory storing instructions that, when executed by the one or more processors, cause the apparatus to:
cause display of video content;
determine, based on viewing information, that the video content is expected to be viewed at a future time associated with a future security level, of a security system, different from a current security level of the security system; and
based on the determining, cause display of a notification indicating that the security system is scheduled to change from the current security level to the future security level after a start time of the video content.

14. The apparatus of claim 13,
wherein the video content is a video program, and
wherein the future time is an end time of the video program.

15. The apparatus of claim 13, wherein the current security level and the future security level are associated with different permitted ranges of motion for a security sensor of the security system.

16. The apparatus of claim 15, wherein the security system is configured to trigger a first alarm based on the security sensor sensing that an object has moved beyond a first permitted range of motion, and wherein the security system is configured to trigger a second alarm based on the security sensor sensing that the object has moved beyond a second permitted range of motion greater than the first permitted range of motion.

17. The apparatus of claim 13, wherein the instructions, when executed by the one or more processors, cause the apparatus to:
determine that the video content has been displayed for a particular time period,
wherein the determining that the video content is expected to be viewed at a future time associated with the future security level is performed after determining that the video content has been displayed for the particular time period.

18. The apparatus of claim 13, wherein the instructions, when executed by the one or more processors, cause the apparatus to:
after determining that the video content has been displayed for a particular time period, cause display of a prompt to adjust lighting conditions.

19. The apparatus of claim 13, wherein the instructions, when executed by the one or more processors, cause the apparatus to:
compare a current volume level of the video content with a predetermined threshold volume level; and after determining that the current volume level of the video content is greater than the predetermined threshold volume level, cause display of a prompt to lower the current volume level.

20. The apparatus of claim 13, wherein instructions cause display of the notification further based on determining that the video content is associated with fear-invoking content.

21. An apparatus comprising:
one or more processors; and
memory storing instructions that, when executed by the one or more processors, cause the apparatus to:
cause display of a video program;
determine a current security level of a security system;
determine that the security system is scheduled to change from the current security level to a future security level after a start time of the video program; and
based on the determining that the security system is scheduled to change from the current security level to the future security level before the start time of the video program, cause display of a notification indicating that the security system is scheduled to change from the current security level to the future security level after the start time of the video program.

22. The apparatus of claim 21, wherein the instructions cause display of the notification further based on determining, based on viewing habits of a user, that the user will continue to view the video program.

23. The apparatus of claim 21, wherein the instructions cause display of the notification further based on determining that the video program has been displayed for at least a particular time period.

24. The apparatus of claim 21, wherein the current security level and the future security level are associated with different permitted ranges of motion for a security sensor of the security system.

25. The apparatus of claim 23, wherein the instructions, when executed by the one or more processors, cause the apparatus to:
after determining that the video program has been displayed for at least a particular time period, cause display of a prompt to adjust lighting conditions.

26. A non-transitory computer-readable medium storing instructions that, when executed by one or more processors, cause:
displaying of a video program;
determining a current security level of a security system;
determining that the security system is scheduled to change from the current security level to a future security level after a start time of the video program; and
based on the determining that the security system is scheduled to change from the current security level to the future security level before the start time of the video program, causing display of a notification indicating that the security system is scheduled to change from the current security level to the future security level after the start time of the video program.

27. The non-transitory computer-readable medium of claim 26, wherein the instructions cause displaying of the notification further based on determining, based on viewing habits of a user, that the user will continue to view the video program.

28. The non-transitory computer-readable medium of claim 26, wherein the instructions cause displaying of the notification further based on determining that the video program has been displayed for at least a particular time period.

29. A non-transitory computer-readable medium storing instructions that, when executed by one or more processors, cause:
displaying of video content;
determining, based on viewing information, that the video content is expected to be viewed at a future time associated with a future security level, of a security system, different from a current security level of the security system; and
based on the determining, displaying of a notification indicating that the security system is scheduled to change from the current security level to the future security level after a start time of the video content.

30. The non-transitory computer-readable medium of claim 29,
wherein the video content is a video program, and
wherein the future time is an end time of the video program.

31. The non-transitory computer-readable medium of claim 29, wherein the current security level and the future security level are associated with different permitted ranges of motion for a security sensor of the security system.

* * * * *

UNITED STATES PATENT AND TRADEMARK OFFICE
CERTIFICATE OF CORRECTION

| | | |
|---|---|---|
| PATENT NO. | : 10,311,713 B2 | Page 1 of 1 |
| APPLICATION NO. | : 15/478358 | |
| DATED | : June 4, 2019 | |
| INVENTOR(S) | : Jim Poder et al. | |

It is certified that error appears in the above-identified patent and that said Letters Patent is hereby corrected as shown below:

In the Specification

Detailed Description, Column 3, Line 29:
Please delete "aimed," and insert --armed,--

In the Claims

Column 15, Line 5:
In Claim 20, before "instructions", please insert --the--

Signed and Sealed this
Sixth Day of September, 2022

Katherine Kelly Vidal
*Director of the United States Patent and Trademark Office*